United States Patent
Mazumder et al.

(10) Patent No.: US 11,429,996 B2
(45) Date of Patent: Aug. 30, 2022

(54) SYSTEM AND METHOD FOR GENERATING PREFERRED AMELIORATIVE ACTIONS USING GENERATIVE ADVERSARIAL NETWORKS

(71) Applicant: International Business Machines Corporation, Armonk, NY (US)

(72) Inventors: Sourav Mazumder, San Ramon, CA (US); Joseph N. Kozhaya, Morrisville, NC (US); Shikhar Kwatra, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 16/748,264

(22) Filed: Jan. 21, 2020

(65) Prior Publication Data
US 2021/0224837 A1    Jul. 22, 2021

(51) Int. Cl.
*G06Q 30/02* (2012.01)
*G06Q 30/06* (2012.01)
*G06N 3/08* (2006.01)

(52) U.S. Cl.
CPC .......... *G06Q 30/0222* (2013.01); *G06N 3/08* (2013.01); *G06Q 30/0631* (2013.01)

(58) Field of Classification Search
CPC ... G06Q 30/0222; G06Q 30/0631; G06N 3/08
See application file for complete search history.

(56) References Cited

U.S. PATENT DOCUMENTS

| | | | |
|---|---|---|---|
| 8,108,406 B2 | 1/2012 | Kenedy et al. | |
| 2014/0129307 A1* | 5/2014 | Walker | G06Q 30/0222 705/14.16 |
| 2019/0122258 A1* | 4/2019 | Bramberger | G06Q 30/0248 |
| 2019/0266196 A1* | 8/2019 | Boyce | G06N 3/0445 |
| 2019/0272890 A1* | 9/2019 | Aliper | G16B 40/00 |
| 2019/0287012 A1* | 9/2019 | Celikyilmaz | G06N 3/0445 |
| 2019/0392314 A1* | 12/2019 | Zhao | G06N 3/006 |
| 2020/0202272 A1* | 6/2020 | Aravamudhan | G06Q 30/016 |
| 2020/0250574 A1* | 8/2020 | Khazane | G06Q 40/02 |
| 2020/0272905 A1* | 8/2020 | Saripalli | G06N 3/006 |
| 2021/0081302 A1* | 3/2021 | Reicher | G06N 3/0445 |

FOREIGN PATENT DOCUMENTS

| | | | | |
|---|---|---|---|---|
| CN | 108171266 A | 6/2018 | | |
| CN | 108596265 A | 9/2018 | | |
| CN | 108734276 A | 11/2018 | | |
| GB | 2291996 A | * | 2/1996 | G06F 3/0346 |
| WO | WO 2018/206594 A1 | 11/2018 | | |

* cited by examiner

*Primary Examiner* — Scott C Anderson
(74) *Attorney, Agent, or Firm* — Terrile, Cannatti & Chambers, LLP; Emmanuel A. Rivera

(57) ABSTRACT

A method, system and computer-usable medium are disclosed for improving likelihood of user to purchase a product or service. Interactions of a person, not necessarily the user, are monitored related to the product or service, along with actions by a business related to the person and the product or service. A trained Generative Adversarial Network model is applied to the monitored interactions to form recommend actions that the business should take to achieve ameliorative actions by the user. A reward feedback iterative adjustment of the GAN model is used to facilitate purchase of the product or service by the user.

20 Claims, 5 Drawing Sheets

SYSTEM AND METHOD FOR GENERATING PREFERRED AMELIORATIVE ACTIONS USING GENERATIVE ADVERSARIAL NETWORKS

BACKGROUND OF THE INVENTION

Field of the Invention

The present invention relates in general to the field of computers and similar technologies, and in particular to software utilized in this field. Still more particularly, it relates to a method, system and computer-usable medium for generating ameliorative actions to influence users' actions.

Description of the Related Art

Influencing individuals, whose actions can benefit another entity, and determining what actions or set of actions the other entity can undertake can be highly desirable. In the case of a business and existing or potential customers, the business desires customers to perform actions such as making purchases, upgrading products/services, and/or performing other actions that would profit or provide benefit to the business. In particular, it is highly desirable to determine or identify particular actions or sets of actions that a business can undertake to drive customers or users to make a purchase, upgrade products/services, or perform other actions that are beneficial to the business.

Customers can undertake many and different actions before making a purchase. There can be a large number of touchpoints through different channels, devices, etc. before a customer makes a purchase. For example, to support a major marketing and sales campaign, understanding customer actions that are undertaking to the point of making a purchase would help in the success of such a marketing and sales campaign. Furthermore, proactive actions that a business can take to influence customer actions would help in realizing success for the business.

SUMMARY OF THE INVENTION

A method, system and computer-usable medium are disclosed for for improving likelihood of user to purchase a product or service. Interactions of a person, not necessarily the user, are monitored related to the product or service, along with actions by a business related to the person and the product or service. A trained Generative Adversarial Network model is applied to the monitored interactions to form recommend actions that the business should take to achieve ameliorative actions by the user. A reward feedback iterative adjustment of the GAN model is used to facilitate purchase of the product or service by the user.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

A system, method, and computer-readable medium are disclosed for generating ameliorative actions to influence users' actions. In particular, generating preferred ameliorative actions using generative adversarial networks is described herein. Ameliorative actions are actions that tend to make better or benefit an influencing entity. For example, the ameliorative actions are actions by customers that benefit a business, such as a purchase of a product or service. Businesses encompass various industries, including e-commerce, healthcare, insurance, wealth management, etc. In business industries, in retail business, ensuring customer conversion and reducing churn is a goal. For health care, predicting members' health care activities and providing appropriate guidance accordingly is a goal. For the gaming industry, ensuring customer's conversion and reducing churn is a goal.

Another use case is an environmental campaign, where influencing entities desire to have people perform ameliorative actions of cleaning up the environment. A determination is made as to what actions the influencing entity(ies) can undertake that will result in ameliorative actions being performed by the entities that are being influenced.

For example, in the case of a business, the business is interested to increasing the likelihood of a user making a purchase. The interactions of a person related to a product are monitored, as well as the actions of the business related to the person and product. Trained Generative Adversarial Networks (GANs) models are applied to the monitored interactions to form recommended actions by the business. A reward feedback adjustment of the GAN model is utilized to facilitate purchase of the product by the user.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
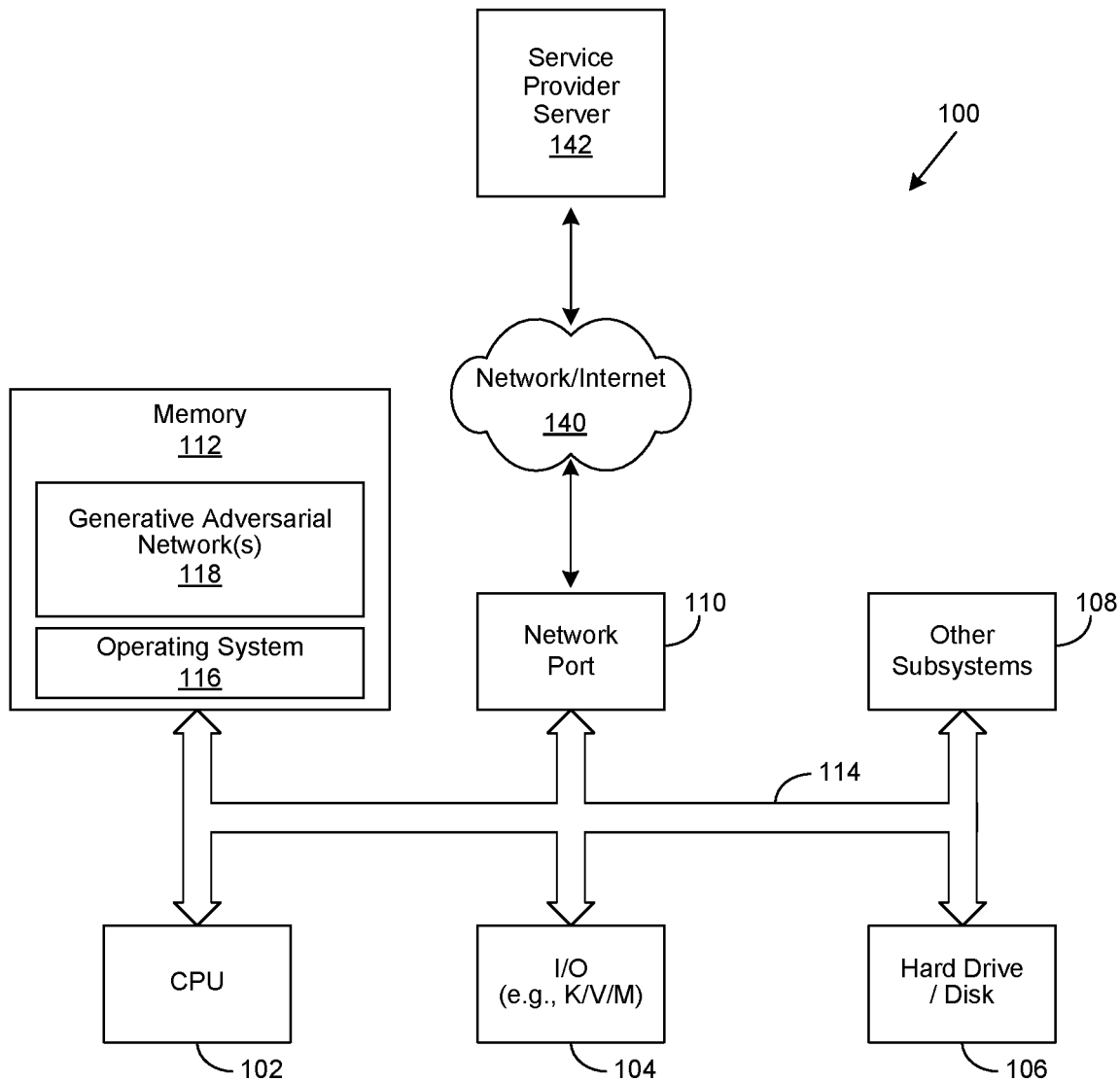
FIG. 1 is simplified block diagram of an information handling system capable of performing computing operations.

FIG. 1 is a generalized illustration of an information handling system 100 that can be used to implement the system and method of the present invention. In certain implementations, the information handling system 100 provides for generating ameliorative actions to influence users' actions. The information handling system 100 can be configured to receive actions from users which an entity is trying to influence and provide actions to the entity which result in ameliorative actions by the users.

The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, the information handling system 100 also includes network port 110 operable to connect to a network 140, which is likewise accessible by a service provider server 142. The network 140 may include local network connections and remote connections in various embodiments, such that information handling system 100 may operate in environments of any size, including local and global, e.g., the Internet. The network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

The information handling system 100 likewise includes system memory 112, which is interconnected to the foregoing via one or more buses 114. System memory 112 further comprises operating system (OS) 116 and in various embodiments may also include a Generative Adversarial Network(s) or GAN(s) 118. It is to be understood, that in other implementations, the GAN(s) 118 is part of different or performed by various information handlings systems, such as various servers and computing devices. It is also understood in certain implementations, that GAN(s) 118 is part of a cloud computing system.

Figure 2:
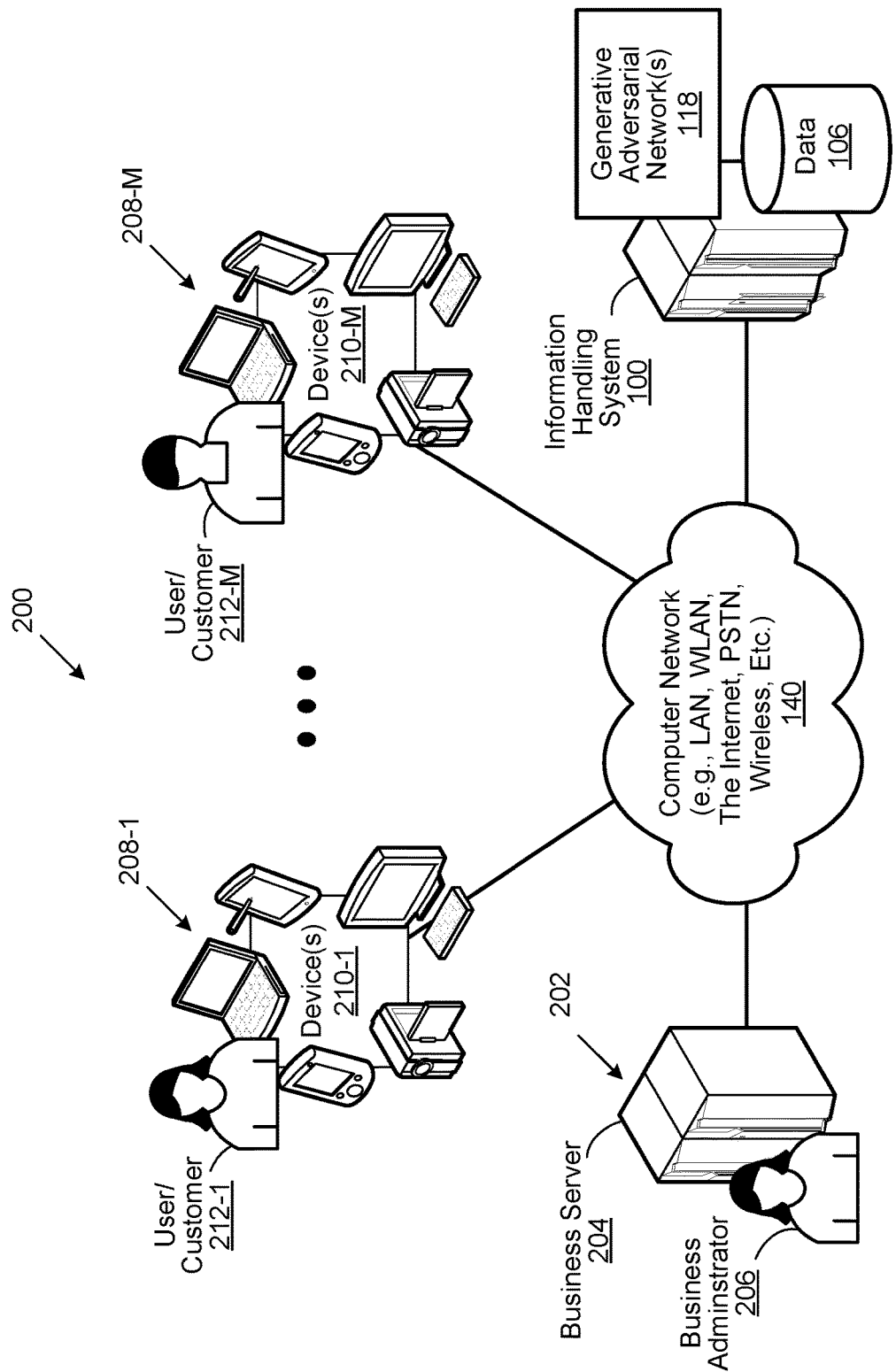
FIG. 2 depicts a system that supports generating preferred ameliorative actions using generative adversarial networks.

FIG. 2 is a generalized illustration of a system 200 that supports generating preferred ameliorative actions using generative adversarial networks. In particular, the system 200 includes the information handling system 100 that includes the GAN(s) 118 and data 106. In certain implementations, the system 200 includes an influencing entity 202, such as a business represented as computing device or business server 204. Business server 204 is accessed and operable by a business administrator(s) 206. In particular, business administrator(s) 206 perform operations through business server 204.

The system 200 further includes entities (e.g., users/customers) 208-1 to 208-M, where "M" can be any number one or greater. Entities (e.g., users/customers) 208-1 to 208-M include respective devices 210-1 to 210-M operable by user/customer 212-1 to 212-M. The devices 210-1 to 210-M can include a personal computer, a laptop computer, a tablet computer, a personal digital assistant (PDA), a smart phone, a mobile telephone, or other device that is capable of communicating and processing data.

In certain implementations, GAN(s) 118 generates a sequence of actions that influencing entity 202 or business takes in response to actions, either previous or expected actions, that are taken by the entities (e.g., users/customers) 208-1 to 208-M. The GAN 118 applies such a sequence of actions of the entity 202 and entities 208-1 to 208-M within a reinforcement learning solution, where the state and action are determined by a generator component or network and the reward is decided by a discriminator component or network as further described below.

In certain implementations, the information handling system 100 monitors the interactions of entities (e.g., users/customers) 208-1 to 208-M related to a product or service provided by business 202. The actions of the business 202 are monitored as related to the entities (e.g., users/customers) 208-1 to 208-M and the product or service. The GAN(s) 118 is a trained model that is applied to the monitored interactions, forming recommended actions that the business 202 should take to achieve ameliorative actions by the user. A reward feedback iterative adjustment of the GAN(s) 118 is used to facilitate purchase of the product or service by the entities (e.g., users/customers) 208-1 to 208-M.

In certain implementations, the GAN(s) 118 represents the interactions of entities (e.g., users/customers) 208-1 to 208-M in an embedded form. Initial training of GAN(s) 118 as further described below is through a Generator Network of the GAN(s) 118 that includes a recurrent neural network (RNN) implementing long short-term memory (LSTM), and a discriminator network that is initially trained using a convolutional neural network (CNN) that distinguishes between real and fake actions.

In certain implementations, a reinforcement learning policy is applied to the GAN(s) 118 based on the interactions of entities (e.g., users/customers) 208-1 to 208-M over a period of time. Examples of interactions between the business 202 and the entities (e.g., users/customers) 208-1 to 208-M include showing relevant content, triggering a chat, emailing specific demos for use cases, offering a discount, offering technical expertise, inviting to a webinar, etc.

Figure 3:
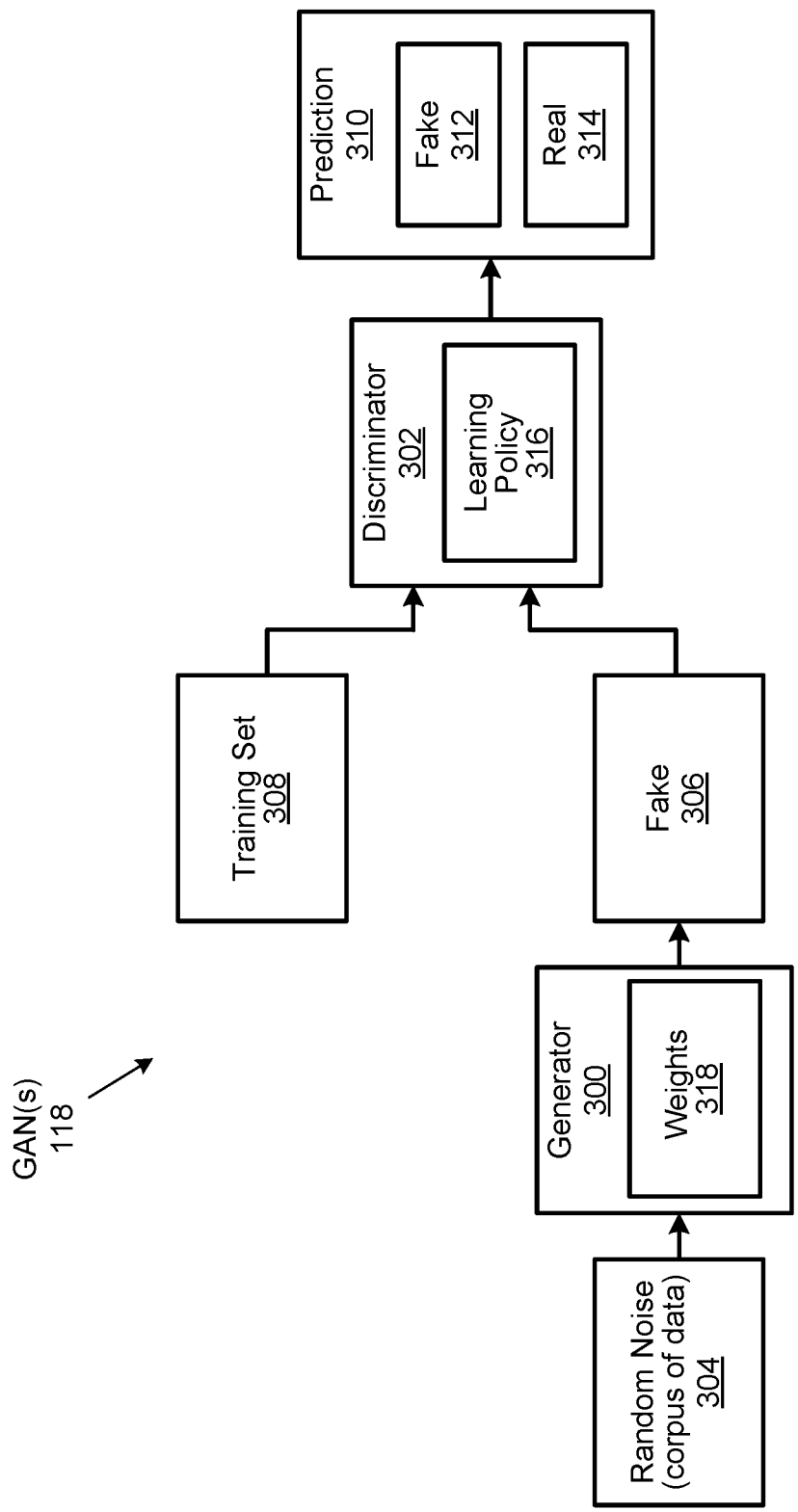
FIG. 3 depicts a Generative Adversarial Network for generating preferred ameliorative actions.

FIG. 3 is an example Generative Adversarial Network for generating preferred ameliorative actions, such as GAN(s) 118. GAN(s) 118 is considered as including two networks, therefore is referred in the plural GANs 118. One network is a generator network 300 and the other is a discriminator network 302. In certain implementations, generator network 300 and discriminator network 302 are neural networks, such as convolutional neural networks (CNN) and recurrent neural network (RNN). In GAN(s) 118 the two neural networks, the generator network 300 and discriminator network 302 contest with one another with a training set and generating new data.

The generator network 300 generates data instances, while the discriminator network 302 evaluates the generated data instances for authenticity. In other words, the discriminator network 302 decides whether each instance of data that is reviewed belongs to the actual training dataset or not. In certain implementations, the generator network 300 takes in random data and returns/generates data. The generated data is fed to the discriminator network 302 along with a stream of other data taken from actual data set that is real (truthful). The discriminator network 302 takes both real and fake data and returns possibilities or makes a determination as to real or fake data. Therefore, double feedback loop exists, where the discriminator network 302 is in a feedback loop with a data set that is real (truthful), and the generator network 300 is in a feedback loop with the discriminator network 302.

In at least one embodiment, GAN(s) 118 generate a sequence of actions that the business 202 takes in response to actions taken and will be taken by entities (e.g., users/customers) 208-1 to 208-M, and apply that sequence of actions with a reinforcement learning solution where the state and action are determined by the generator network 300 and a reward is decided by the discriminator network 302. The GAN(s) 118 model is trained in a dynamic way with a mix of actions that entities (e.g., users/customers) 208-1 to 208-M has already taken and also the actions that will be taken, which can then be used to generate recommended actions by the business 202, which can lead to ameliorative actions by entities (e.g., users/customers) 208-1 to 208-M, such as purchasing a product or service.

In certain implementations, actions are represented in an embedded form recognizable by the GAN(s) 118 and generator network 300 and discriminator network 302. In certain implementations, the embedded form allows for mapping of such actions.

Random noise (corpus of data) 304 is used to initially train the generator network 300. In certain implementations, the generator network 300 implements recurrent neural networks (RNN) with long short-term memory (LSTM). The generator network 300 creates fake actions 306 which are received by discriminator network 302.

Using a training set 308 the discriminator network 302 is initially trained to be able to recognize between real and fake sequences of actions that produce a desirable outcome. The discriminator network provides a prediction 310 as to fake sequences 312 or real sequences 314.

In certain implementations, for a given user of entities (e.g., users/customers) 208-1 to 208-M, a sequence of actions is captured of user (AU) and supplier (i.e., business) up to time "t". Examples of user actions include the following:

Google search on product (IBM Cloud, DB2, Watson, . . . )
Read marketing content on ibm.com
Sign up for a trial account on ibm cloud
Execute some APIs in test mode (minimal usage)
Increase API usage (from dev to beta testers)
Reduce API usage (indicator for potential churn)
Upgrade to premium subscription Examples of supplier or business actions include the following Show relevant content
Trigger a chat with the user
Email the user specific demos for their use case
Offer a discount
Offer technical expertise to help the user
Invite user to a webinar Table 1 illustrates sequences of actions by a user (AU) and supplier (AS) (i.e., business) and leading to an outcome where the user makes a purchase.

business 202 take actions during their interactions. The corpus of dataset 304 is updated with newly generated data on a regular basis.

Figure 4:
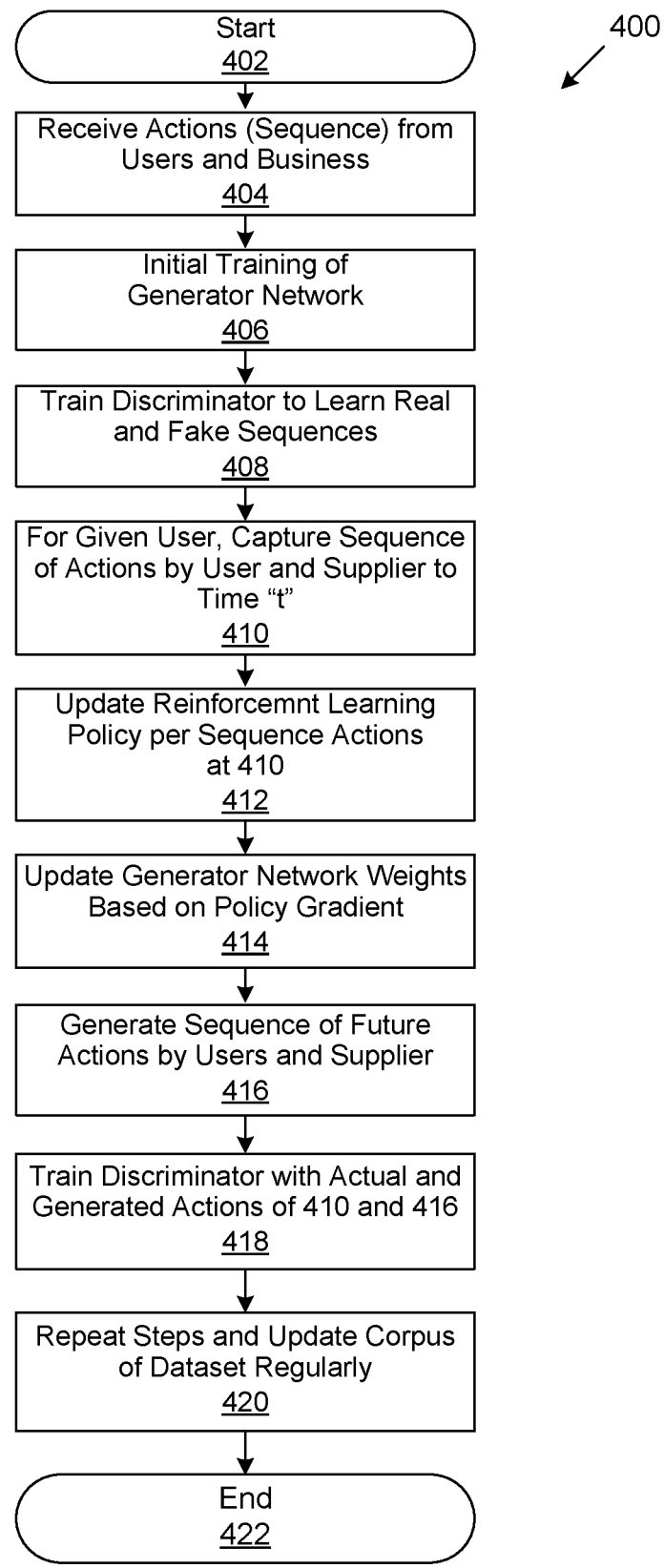
FIG. 4 is a generalized flowchart for use of Generative Adversarial Network for generating preferred ameliorative actions.

FIG. 4 is a generalized flowchart 400 for use of Generative Adversarial Network for generating preferred ameliorative actions. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402 the process 400 starts. At step 404, actions are received from users and a business in a readable form by the GAN(s) 118. In certain implementations, the actions are received in embedded form. It is to be understood, that there can be different techniques to represent actions, such techniques can depend on the number of possible actions that need to be represented and their correlations.

At step 406, initial training is performed on the generator network 300, based on corpus of dataset 304. In certain implementations, the generator network 300 implements RNN with LSTM.

At step 408, the discriminator network 302 is trained to learn between real and fake sequences of actions, which lead to a desirable outcome. In certain implementations, the discriminator network 302 is trained with training set 308 and implemented as a CNN.

At step 410, for a particular given user of entities (e.g., users/customers) 208-1 to 208-M, a sequence of actions are captured by user (AU) and business 202 or supplier (AS) up to a time "t". At step 412, the reinforcement learning policy 316 is updated based on the sequence captures at step 410. At step 414, the weights 318 of generator network 300 are updated based on a policy gradient. At step 416, based on the updated weights, sequence of future actions by users and supplier/business are generated.

TABLE 1

| $A_{t=0}$ | $A_{t=1}$ | $A_{t=2}$ | $A_{t=3}$ | $A_{t=4}$ | $A_{t=5}$ | $A_{t=6}$ | $A_{t=7}$ | $A_{t=8}$ | Outcome |
|---|---|---|---|---|---|---|---|---|---|
| AU = {Google Search} | AU = {Sign up for trial account} | AS = {initiate chat with user} | AU = {explore some services, low usage} | AS = {invite user to webinar} | AU = {user increases usage, dev/test} | AS = {invite user to webinar on new features of service} | AS = {respond to user issues quickly} | AS = {offer user discount} | Purchase |

In certain implementations, the discriminator network 302 includes a reinforcement learning policy 316, which can be updated based on the sequence of user actions AU and supplier/business actions AS captured based on the sequence of AU and AS captured up to time "t" above. In certain implementations, the generator network 300 includes weights 318 that can be updated based on a policy gradient. In certain implementations, the discriminator network 302 generates a sequence of future actions by users interlaced with supplier actions (i.e., AU and AS) based on updated weights. The discriminator network 302 is further trained using actual and generated actions and positive actions form the corpus of data 304. Steps are repeated as the users or entities (e.g., users/customers) 208-1 to 208-M and supplier/

At step 418, the discriminator network 302 is trained with actual and generated actions as determined at steps 410 and 416. At step 420, the steps 410 to 418 can be repeated, and the corpus of dataset 304 updated with newly generated data a regular basis. At block 422, the process 400 ends.

Figure 5:
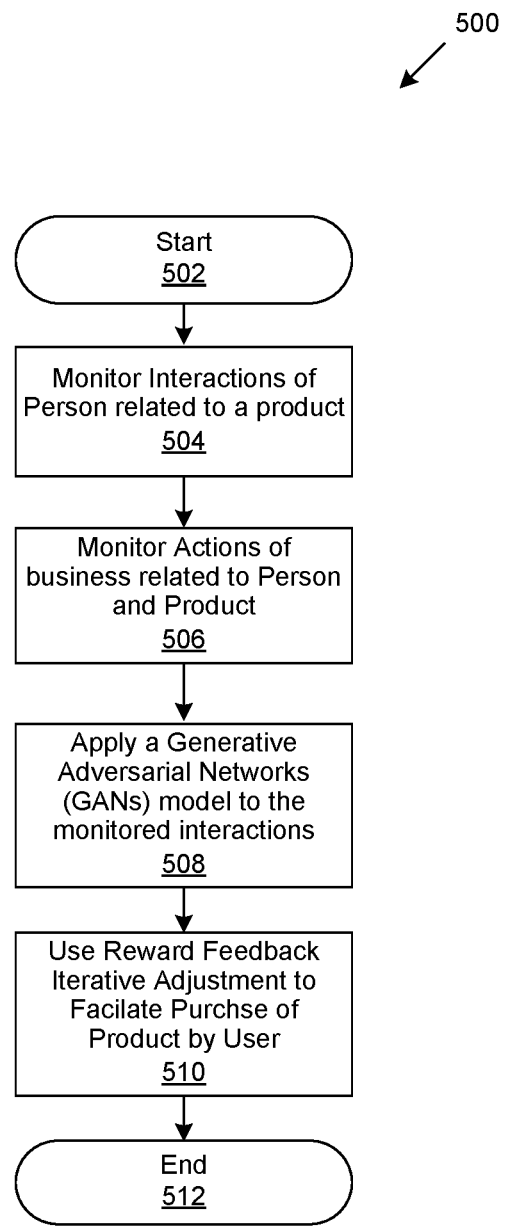
FIG. 5 is a generalized flowchart to reach a positive outcome of a user purchasing a product or service.

FIG. 5 is a generalized flow chart to reach a positive outcome of a user purchasing a product or service. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502 the process 500 starts. At step 504, interactions of a person of entities (e.g., users/customers) 208-1 to 208-M related to a product or service offered by business 202 is monitored. At step 506, the actions of business 202 as related to the person and product are monitored. At step 504, GANs 518 model is applied to the monitored interactions and actions. At step 510, a reward feedback iterative adjustment is used to facilitate the purchase of the product or service by the user. At block 512, the process 500 ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implementable method for improving a likelihood of a person making a purchase comprising:
   monitoring interactions of a person related to a product and actions by a business related to the person and the product;
   applying a trained Generative Adversarial Network (GAN), wherein the GAN is initially trained with random noise or corpus of data, and training of the GAN is dynamic with actions taken and will be taken by users of the product;
   monitoring by the GAN, interactions to generate a sequence of actions by the business in response to the monitored interactions and actions, wherein the GAN applies the sequence of actions within a reinforcement learning solution, and wherein state and action are determined by a generator component and reward is decided by a discriminator component, wherein the generator component generates data instances, and the discriminator component decides whether instances are truthful or untruthful; and
   utilizing a reward feedback iterative adjustment of the model to facilitate a purchase of the product by the user.

2. The method of claim 1, wherein the GANs model represents the interactions in an embedded form.

3. The method of claim 1, wherein the GANs model includes the generator component initially trained via recurrent neural network (RNN) with long short-term memory (LSTM) and discriminator component initially trained via convolutional neural network (CNN).

4. The method of claim 3, wherein the CNN is used to distinguish between real and fake sequence of actions.

5. The method of claim 1, wherein a reinforcement learning policy is based on the interactions over a period of time.

6. The method of claim 1, wherein the actions by the business are interactions with the user selected from a group consisting of showing relevant content, triggering a chat, emailing specific demos for use cases, offering a discount, offering technical expertise, and inviting to a webinar.

7. The method of claim 1, wherein the interactions of a person related to the product is selected from the group consisting of searching on the product, reading marketing content, signing up for a trial account, executing an application program interface, increasing application program interface usage, reducing application program interface usage, and upgrading to a premium prescription.

8. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations for improving a likelihood of a user making a purchase executable by the processor and configured for:
      monitoring interactions of a person related to a product and actions by a business related to the person and the product;
      applying a trained Generative Adversarial Network (GAN), wherein the GAN is initially trained with random noise or corpus of data, and training of the GAN is dynamic with actions taken and will be taken by users of the product;
      monitoring by the GAN, interactions to generate a sequence of actions by the business in response to the monitored interactions and actions, wherein the GAN applies the sequence of actions within a reinforcement learning solution, and wherein state and action are determined by a generator component and reward is decided by a discriminator component, wherein the generator component generates data instances, and the discriminator component decides whether instances are truthful or untruthful; and
      utilizing a reward feedback iterative adjustment of the model to facilitate a purchase of the product by the user.

9. The system of claim 8, wherein the GANs model represents the interactions in an embedded form.

10. The system of claim 8, wherein the GANs model includes the generator component initially trained via recurrent neural network (RNN) with long short-term memory (LSTM) and discriminator component initially trained via convolutional neural network (CNN).

11. The method of claim 10, wherein the CNN is used to distinguish between real and fake sequence of actions.

12. The system of claim 8, wherein a reinforcement learning policy is based on the interactions over a period of time.

13. The system of claim 8, wherein the actions by the business are interactions with the user selected from a group consisting of showing relevant content, triggering a chat, emailing specific demos for use cases, offering a discount, offering technical expertise, and inviting to a webinar.

14. The system of claim 8, wherein the interactions of a person related to the product is selected from the group consisting of searching on the product, reading marketing content, signing up for a trial account, executing an application program interface, increasing application program interface usage, reducing application program interface usage, and upgrading to a premium prescription.

15. A non-transitory, computer-readable storage medium embodying computer program code, the computer program code comprising computer executable instructions configured for:
   monitoring interactions of a person related to a product and actions by a business related to the person and the product;
   applying a trained Generative Adversarial Network (GAN), wherein the GAN is initially trained with random noise or corpus of data, and training of the GAN is dynamic with actions taken and will be taken by users of the product;

monitoring by the GAN, interactions to generate a sequence of actions by the business in response to the monitored interactions and actions, wherein the GAN applies the sequence of actions within a reinforcement learning solution, and wherein state and action are determined by a generator component and reward is decided by a discriminator component, wherein the generator component generates data instances, and the discriminator component decides whether instances are truthful or untruthful; and utilizing a reward feedback iterative adjustment of the model to facilitate a purchase of the product by the user.

16. The non-transitory, computer-readable storage medium of claim 15, wherein the GANs model represents the interactions in an embedded form.

17. The non-transitory, computer-readable storage medium of claim 15, wherein the GANs model includes the generator component initially trained via recurrent neural network (RNN) with long short-term memory (LSTM) and discriminator component initially trained via convolutional neural network (CNN).

18. The non-transitory, computer-readable storage medium of claim 15, wherein a reinforcement learning policy is based on the interactions over a period of time.

19. The non-transitory, computer-readable storage medium of claim 15, wherein the actions by the business are interactions with the user selected from a group consisting of showing relevant content, triggering a chat, emailing specific demos for use cases, offering a discount, offering technical expertise, and inviting to a webinar.

20. The non-transitory, computer-readable storage medium of claim 15, wherein the interactions of a person related to the product is selected from the group consisting of searching on the product, reading marketing content, signing up for a trial account, executing an application program interface, increasing application program interface usage, reducing application program interface usage, and upgrading to a premium prescription.

* * * * *